3,832,141
PRESSURE DIFFERENTIAL FILTERING
APPARATUS
Ioakim Haldopoulos, Fairburn, Ga., assignor to
Glasrock Products, Inc., Atlanta, Ga.
Filed Jan. 3, 1973, Ser. No. 320,831
Int. Cl. B01d 33/00
U.S. Cl. 23—259                                5 Claims

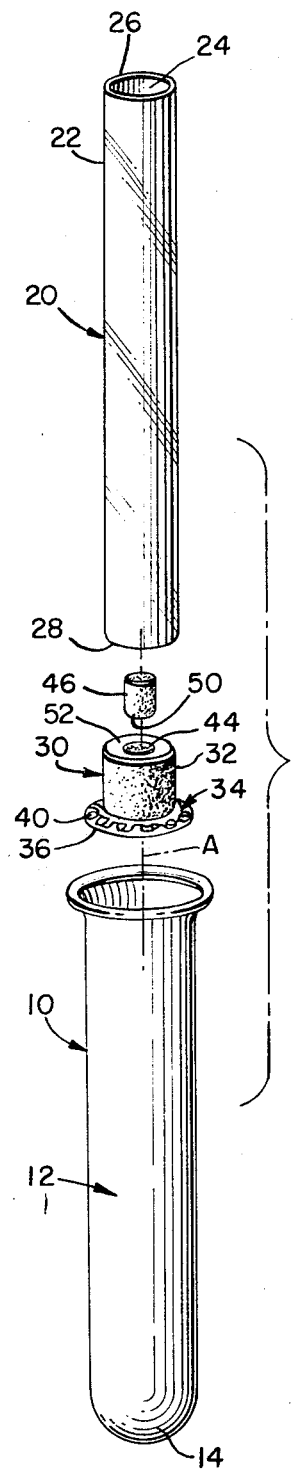
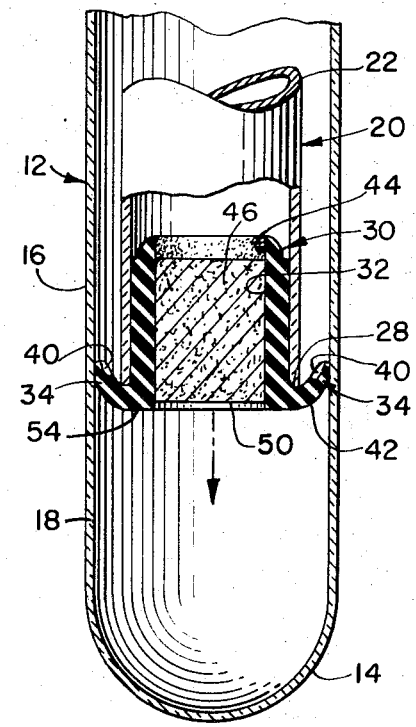
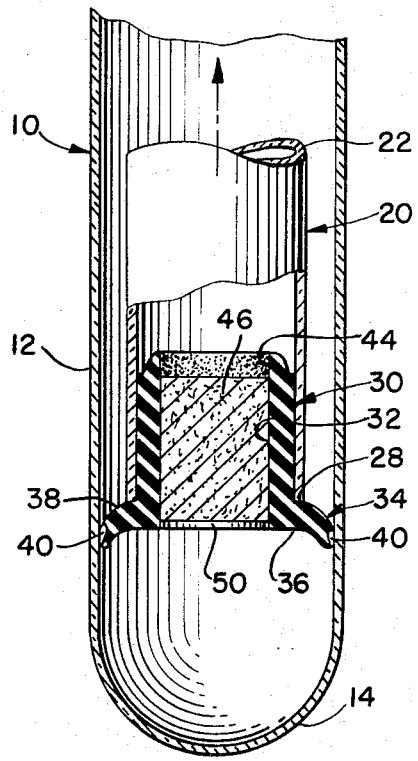

ABSTRACT OF THE DISCLOSURE

A pressure differential filtering apparatus which includes an elongated sampling tube, open at both ends, one end having a resilient lip forming a piston. A filter is mounted within a longitudinal passageway within the piston. The lower surface of the lip is capable of forming a seal with the interior walls of a container holding the liquid to be filtered and the upper surface is provided with a plurality of raised portions, such as serrations, corrugations, or nodules, so that the upper surface is incapable of forming a seal with the interior walls of the container. This arrangement allows the passage of air around the resilient lip upon withdrawal from the container so that the sample collected in the tube is not sucked back into the container through the filter.

BACKGROUND OF THE INVENTION

This invention is concerned with a device for the filtration and separation of liquid mixtures that have been stratified or contain precipitates of the like. Such a device is particularly useful in the analysis of blood samples where it is necessary to separate the blood cells from the serum. U.S. Pats. 3,355,098 and 3,481,447 issued to Farr, U.S. Pat. 3,512,940 issued to Shapiro and U.S. Pat. 3,693,804 issued Sept. 26, 1972 to Grover disclose apparatus which exemplifies the prior art. The Grover Pat. 3,693,804 is assigned to the same assignee as the present invention.

It is desirable in some instances to be able to withdraw the filter sampler tube without the blood serum being transferred back into the test tube containing the unfiltered blood cells. To achieve this end, a means is needed to prevent the creation of a vacuum between the piston lip and the bottom section of the container as the sampler is withdrawn. The specification of Grover Pat. 3,693,804 describes a method for withdrawing the sampler, with a filtrate sample, from the container. The method described involves urging the elongated sampling member to one side of the container in order to compress a part of the piston lip against an inside wall of the container. It is necessary to form such a gap between the lip and the container wall in order to withdraw the sampler from the container without causing the filtrate to be sucked back through the filter and into the container. The present invention automatically permits the passage of air around the piston lip during withdrawal of the sampler.

SUMMARY OF THE INVENTION

The present invention is directed to a device which serves both to filter and to separate one of several stratified immiscible liquids. The device also has utility in the filtration and separation of liquids containing precipitates or particulate solids. The device includes an elongated sampling tube having a hollow interior, open at both ends, and a resilient piston at one end. The piston of the sampling tube is provided with a longitudinal passageway to allow liquid to pass through it from the container into the hollow interior collecting section of the sampling tube.

A filter is mounted within the longitudinal passageway of the piston. The piston has a concentrically disposed flexible lip, integral with and projecting outwardly from, the body of the sampling tube. The cross-sectional area of the lip is slightly larger than that of the container so that the lip engages and wipes the inside surface of the test tube, or other container, during insertion and withdrawal.

The lower surface of the lip is relatively smooth so that, upon insertion into the container, a seal is formed between the smooth surface and the container wall causing pressure to be formed within the sample space ahead of the lip, which pressure causes the liquid to flow upwardly through the filter and into the hollow interior of the sampling tube.

The opposite, or upper, surface of the lip is formed with a plurality of irregularities in the form of notches, corrugations, serrations, nodules, or the like, so that upon withdrawal of the sampling tube, no seal is formed between the lip and the interior walls of the container. The passageways between the piston lip and interior walls of the container allow for the free flow of air during withdrawal of the sampler tube and thereby avoid the formation of a vacuum within the sample space which otherwise would tend to cause the filtrate to be drawn back through the filter and into the container.

BRIEF DESCRIPTION OF THE DRAWINGS

FIG. 1 is an exploded perspective view of a pressure differential filtering apparatus constructed in accordance with the present invention;

FIG. 2 is an enlarged vertical fragmented sectional view showing the piston within a test tube, as it appears during the insertion step; and FIG. 3 is an enlarged vertical fragmented sectional view similar to FIG. 2, but showing the piston as it appears during the withdrawal step.

DESCRIPTION OF THE PREFERRED EMBODIMENT

Referring now in detail to the embodiment chosen for the purpose of illustrating the present invention, numeral 10 denotes generally a container or test tube of glass or plastic or the like. The test tube 10 is conventional in that it has a hollow cylindrical body 12 which is closed at its bottom by a hemispherical or concave end 14. The container's outside cylindrical wall is identified by the reference number 16 and its inside cylindrical wall by the numeral 18.

The sampling tube, denoted generally by the numeral 20, is a hollow tubular cylinder which has a smooth cylindrical outside wall 22 and a smooth cylindrical inside wall 24 disposed concentrically along a vertical axis A, as illustrated in FIG. 1. The hollow interior of the sampling tube 20 which serves to collect the filtrate is defined by the inside wall 24 and is cylindrical throughout its length being open both at the upper end 26 and at the lower end 28 of the tube 20.

It is contemplated that the elongated sampling tube 20 may be of any cross-sectional shape, but since the preferred container is a standard test tube 10, the preferred cross-sectional shape for the sampling tube is circular. The sampling tube 20 is longer than the test tube 10 so that one end 26 protrudes from the top of the test tube when the opposite end 28 is inserted to the bottom of the test tube.

Lower end 28 of the sampling tube 20 is provided with a piston 30 which is formed from rubber, neoprene, or an equivalent elastomeric or rubberlike material. The piston 30 includes a cylindrical body 32 which is of a slightly larger diameter than the diameter of the inside wall 24 of the sampling tube 20. The body 32 of the piston 30 is press-fitted into the lower end 28 of the sampling tube 20 wherein it is held by frictional force.

Alternatively, the entire sampling tube 20 may be constructed of the same material as the piston so that the piston 30 may be formed integrally therewith.

The body 32 of the piston 30 is provided at its lower end 54 with a flexible, annular, radially extending lip 34 having a rounded rim 36. The upper surface 38, FIG. 3, of the lip 34 is provided with a plurality of serrations 40. The bottom surface 42, FIG. 2, of the lip 34 is relatively smooth so that it can form an air-tight seal with the interior walls of the container 10 as it is inserted.

Optionally, the bottom surface 42 of the piston may be frusto-conical in shape so as to reach into the concave bottom end 14 of the test tube 10. The diameter of the rim 36 of the lip 34 is slightly larger than the diameter of the inside cylindrical wall 18 of the test tube 10 so that the lip 34 must be compressed and deflected upon insertion into the test tube and thereby form the air-tight seal between its bottom surface 42 and the inside wall 18 of the test tube. Of course, additional lips or flanges, similar to lip 34 may be provided on the piston body for additional sealing.

The piston 30 has a longitudinal passageway 44 which is cylindrical in shape and which has a uniform diameter throughout its length. Within the longitudinal passageway 44 is an elongated, cylindrical, porous, plastic filter 46 which has a plurality of interconnected voids defining passageways or channels through the material. The filter 46 is press fitted into the passageway 44 and is frictionally held in place.

The longitudinal passageway 44 through the piston 30 may be modified to better hold the filter by making it of a nonuniform diameter, e.g. sloped or stepped. The longitudinal passageway 44 opens both to the interior of the sampling tube 20 at upper surface 52 of piston 30 and to the container 10 at lower surface 54. The lower end 50 of the filter 46 terminates short of the lower end 54 of the longitudinal passageway 44 so that the lower surface 50 of the filter member is protected from contact with the bottom end 14 of the container 10.

Instead of the unitary filter 46 depicted in the drawings, the filter may be composed of two or more layers of differing porosity. The filter also may be of a nonuniform diameter in order to increase the frictional forces holding it within the passageway 44 of the piston 30.

To operate the device, the liquid to be separated is placed within the container 10, and the sampling tube 20 is inserted with the piston end 30 first. During insertion downwardly into the container, the lip 34 of the piston 30 is deflected upwardly to assume the convex configuration shown in FIG. 2, with the smooth bottom surface 42 of the lip 34 circumferentially engaging the inside wall 18 of the container 10 to form an air-tight seal therewith. As the sampling tube 20 is urged inwardly, the pressure within the space between the lip 34 and the bottom of the container end 14 is increased, thereby forcing the fluid upwardly through the filter 46 and into the interior of sampling tube 20.

After a liquid sample of the desired volume is collected within the tube 20, the sampling tube is pulled outwardly. During withdrawal from the test tube, the lip 34 of the piston 30 flips over and automatically assumes the concave configuration depicted in FIG. 3, with the upper surface 38 of the lip 34 engaging the inside cylindrical wall 18 of the container 10. Due to the presence of the serrations 40 on the contacting surface 38, no seal is formed between the lip 34 and the container wall 18. During withdrawal, air flows through the spaces between the serrations so that no vacuum forms within the sample space between the lip 34 of the piston and the bottom end 14 of the container, thus allowing the sampling tube 20 to be withdrawn with the filtrate sample trapped above the filter 46.

Alternatively, the tube 20 may be left within the test tube as shown in FIG. 2, and the filtrate may be removed therefrom by a pipette (not shown), by pouring, or by any other suitable means.

While the above description is limited to a specific embodiment of the apparatus, it is understood that various modifications within the spirit of the invention may occur to those skilled in the art. Therefore, it is intended that no limitations be placed on the invention except as defined by the scope of the appended claims.

I claim:

1. A pressure differential filtering apparatus comprising:

an elongated sampling member having a hollow interior portion for the collection of liquid, one end of said sampling member having a resilient lip projecting radially outwardly to form a piston, said lip having a first surface for forming a seal with the interior walls of a container holding the liquid to be filtered and a second surface having a plurality of irregularities for breaking said seal with the interior walls of said container, said piston having a longitudinal passageway to allow liquid to pass therethrough into said hollow interior of said sampling member; and a porous filter member fitted within said longitudinal passageway.

2. The apparatus of claim 1 wherein said irregularities are in the form of serrations.

3. A pressure differential filtering apparatus for separating a liquid comprising:

a hollow cylindrical walled container having a closed bottom and an open top; an elongated sampling member having a hollow interior for the collection of liquid, one end portion of said sampling member having a resilient lip projecting radially to form a piston, said lip having a first surface for forming a seal with the interior walls of said container and a second surface having a plurality of irregularities for breaking said seal with the interior walls of said container, said piston having a longitudinal passageway to allow liquid to pass therethrough into the hollow interior of said sampling member; and a porous filter member fitted within said longitudinal passageway of said piston.

4. The apparatus of claim 3 wherein said irregularities are in the form of serrations.

5. An apparatus comprising a cylinder, and a piston capable of acting in cooperation with said cylinder, said piston having an elastomeric lip, said lip having a first surface forming a seal with the interior wall or walls of said cylinder when said piston is moved in one direction and a second surface engaging said wall or walls when said piston is moved in the opposite direction provided with a plurality of irregularities so that said second surface is incapable of forming a seal with the interior wall or walls of said cylinder.

References Cited

UNITED STATES PATENTS

| | | | |
|---|---|---|---|
| 3,693,804 | 4/1972 | Grover | 210—359 |
| 2,884,291 | 4/1959 | Whitten | 92—240 X |
| 3,464,798 | 9/1969 | Kilthau | 210—359 X |
| 3,481,477 | 12/1969 | Farr | 210—359 |
| 3,512,940 | 5/1970 | Shapiro | 210—359 X |
| 3,586,064 | 6/1971 | Brown | 210—359 X |
| 3,661,265 | 5/1972 | Greenspan | 210—359 |
| 955,321 | 4/1910 | Cornell | 417—555 X |
| 3,037,781 | 6/1962 | Persas | 92—240 UX |
| 3,266,385 | 8/1966 | Scaramucci | 92—740 X |

MORRIS O. WOLK, Primary Examiner

S. MARANTZ, Assistant Examiner

U.S. Cl. X.R.

Notice of Adverse Decision in Interference

In Interference No. 99,018, involving Patent No. 3,832,141, I. Haldopoulos, PRESSURE DIFFERENTIAL FILTERING APPARATUS, final judgment adverse to the patentee was rendered Jan. 14, 1977, as to claims 1, 2, 3, 4 and 5.

[*Official Gazette May 3, 1977.*]